(12) United States Patent
Xiu et al.

(10) Patent No.: US 10,464,813 B2
(45) Date of Patent: Nov. 5, 2019

(54) PROCESS FOR RECOVERY AND PURIFICATION OF NITROUS OXIDE

(71) Applicant: AIR PRODUCTS AND CHEMICALS, INC., Allentown, PA (US)

(72) Inventors: Guohua Xiu, Shanghai (CN); Peng Zhang, Shanghai (CN)

(73) Assignee: VERSUM MATERIALS US, LLC, Tempe, AZ (US)

( * ) Notice: Subject to any disclaimer, the term of this patent is extended or adjusted under 35 U.S.C. 154(b) by 199 days.

(21) Appl. No.: 14/295,724

(22) Filed: Jun. 4, 2014

(65) Prior Publication Data

US 2014/0366576 A1 Dec. 18, 2014

(30) Foreign Application Priority Data

Jun. 18, 2013 (CN) .......................... 2013 1 0262637
Jun. 18, 2013 (CN) ..................... 2013 2 0375675 U (51) Int. Cl.
*F25J 1/00* (2006.01)
*C01B 21/22* (2006.01)

(52) U.S. Cl.
CPC .............. *C01B 21/22* (2013.01); *Y02C 20/10* (2013.01)

(58) Field of Classification Search
CPC ... C01B 21/22; Y02C 20/10; F25J 1/00; F25J 1/02; F25J 3/02; F25J 3/06; F25J 3/08; B01D 3/14; B01D 53/14; B01D 2257/40; B01D 2257/402; B01D 2257/404
See application file for complete search history.

(56) References Cited

U.S. PATENT DOCUMENTS

| | | | | |
|---|---|---|---|---|
| 2,850,881 A | * | 9/1958 | Hampton | C01B 21/22 62/617 |
| 4,264,566 A | * | 4/1981 | Giles | B01J 19/0013 422/109 |
| 5,759,237 A | * | 6/1998 | Li | B01D 53/228 95/128 |
| 6,080,226 A | | 6/2000 | Dolan et al. | |
| 6,505,482 B2 | * | 1/2003 | Zhou | B01D 3/322 62/292 |
| 2011/0023538 A1 | * | 2/2011 | Teles | C01B 21/22 62/617 |
| 2011/0023713 A1 | * | 2/2011 | Rossler-Feigel | C01B 21/22 95/156 |
| 2013/0055729 A1 | * | 3/2013 | Mak | B01D 53/1425 62/56 |
| 2013/0312427 A1 | * | 11/2013 | Hashi | B01D 53/0462 62/6 |

FOREIGN PATENT DOCUMENTS

| | | |
|---|---|---|
| CN | 1498669 A | 5/2004 |
| CN | 102046524 A | 5/2011 |
| EP | 0636576 A1 | 1/1995 |

(Continued)

*Primary Examiner* — Keith M Raymond
*Assistant Examiner* — Webeshet Mengesha
(74) *Attorney, Agent, or Firm* — Lina Yang (57) ABSTRACT

This invention is aimed at recovering and purifying nitrous oxide from the gas stream containing $N_2O$ to produce different grade of nitrous oxide by combination of unit operation including, but not limited to, wet scrubbing, adsorption, liquefaction, flash distillation or continuous distillation with reflux.

5 Claims, 3 Drawing Sheets

(56) References Cited

FOREIGN PATENT DOCUMENTS

| | | |
|---|---|---|
| EP | 0799792 A1 | 1/1997 |
| EP | 1076217 A2 | 2/2001 |
| JP | 54020994 | 2/1979 |
| JP | 07035470 | 2/1995 |
| JP | 09286607 | 11/1997 |
| JP | 2001114504 | 4/2001 |
| JP | 2004010391 | 1/2004 |
| JP | 4031293 B2 | 1/2008 |
| JP | 2011517651 | 6/2011 |
| TW | 455505 | 9/2001 |
| TW | 542896 | 7/2003 |

\* cited by examiner

PROCESS FOR RECOVERY AND PURIFICATION OF NITROUS OXIDE

BACKGROUND OF THE INVENTION

The classical approach to manufacturing nitrous oxide ($N_2O$) is via ammonium nitrate decomposition. Nitrous oxide is a by-product in nitric acid production process. Nitrous oxide is also produced in large volumes as a by-product in the synthesis of adipic acid; one of the two reactants used in nylon manufacture.

Adipic acid is a dicarboxylic acid manufactured by a two-stage process. The first stage of manufacturing usually involves the oxidation of cyclohexane to form a mixture of cyclohexanone and cyclohexanol. The second stage involves oxidizing the mixture with nitric acid to produce adipic acid. Nitrous oxide is generated as a by-product of the nitric acid oxidation stage.

On the basis of experiments, the overall reaction stoichiometry for $N_2O$ production in the preparation of adipic acid was estimated at approximately 0.3 kg of $N_2O$ per kilogram of the product.

With such large volume, the by-product from the synthesis of adipic acid can become a major commercial source for $N_2O$. However, recovering $N_2O$ from the off gas stream from the synthesis of adipic acid requires the removal of various impurities; such as, higher oxides of nitrogen, carbon dioxide, carbon monoxide, nitrogen, oxygen, argon, moisture, and organic impurities. Currently much of the off gas stream is decomposed before release for environmental protection.

Work has been done either to recover and purify nitrous oxide for different purposes or to deplete nitrous oxide from industrial off gas streams for environmental protection.

A conventional nitrous oxide purification system and process is described in EP 0636576 A1. More specifically, the processes starts with compressing a nitrous oxide feed gas that contains nitrogen, oxygen and water in a compressor. A portion of nitrous oxide, free of water, is conveyed to a heat exchanger where it is condensed to a liquid. The liquid gas is directed to the top of a rectification column for further condensation and returned to the bottom of the rectification column. A second mixed gas-liquid nitrous oxide portion is directed from the heat exchanger to the bottom of the rectifying column as a heating source to vaporize the liquid. The same nitrous oxide is then directed out of the bottom of the column and introduced to the middle of the column. The final product is taken from the bottom of the column having the requisite purity.

One of the disadvantages associated with such a system is that it is complex, as it includes three heat exchangers and two rectification sections. In addition, the compressor employed is potentially a secondary source of contamination due to the lubricating oils needed to operate it.

An invention relates to processes for the separation of nitrous oxide from feed streams containing mixtures thereof with oxygen and nitrogen is described in U.S. Pat. No. 6,080,226. In the process, the feed stream comprising nitrous oxide is purified by a pressure swing adsorption (PSA) process employing a co-purge with an oxygen-lean stream to produce a high purity nitrous oxide stream. Nitrous oxide is selectively adsorbed, thus the first effluent stream contains $N_2$ and $O_2$. The high purity nitrous oxide stream can be incorporated in a complex for the production of adipic acid to recover nitrous oxide from a dilute waste stream and pass the recovered nitrous oxide to a process for the production of phenol from an aromatic hydrocarbon. Unreacted nitrous oxide from the phenol production step acid can be recovered in a second, or vent PSA step, and combined with the recovery of byproduct nitrous oxide waste streams from the production of adipic for the overall recovery of nitrous oxide, thereby significantly reducing nitrous oxide emissions from the production of adipic acid.

U.S. Pat. No. 6,348,083 B1 teaches an installation and a process for the recovery and/or purification of the nitrous oxide contained in a waste gas. The waste gas contains at least one portion of the nitrous oxide ($N_2O$) and at least one other gaseous compound. The process further teaches that: (a) at least one nitrous oxide portion contained in the flow of waste gas is separated by permeation, and (b) at least a portion of the gaseous nitrous oxide separated in step (a) is recovered. Preferably, the source of the flow of waste gas is an industrial unit using an industrial process giving off the waste gas, preferably a unit for the production of adipic acid, a unit for the production of nitrous oxide, a unit for the production of glycoxylic acid or a unit for the production of nitric acid.

A disadvantage associated with the systems described above and other related art systems is that they are not capable of removing carbon dioxide impurity. It is well known to those skilled in the purification art that carbon dioxide is one of the most difficult impurities to be removed from a gas containing nitrous oxide.

Additionally, although useful in removing nitrogen, oxygen, hydrogen, carbon monoxide, and water impurities, the systems described above and other related art systems are not capable of removing other impurities such as ammonia, and methane. Carbon monoxide, ammonia, methane and hydrogen are light impurities.

U.S. Pat. No. 6,370,911 B1 provided a system and method for nitrous oxide purification, wherein the nitrous oxide product can be used in semiconductor manufacturing. The system and process involve a first sub-system having a purification tank for holding a liquefied nitrous oxide; a vaporizer in communication with the purification tank to receive, vaporize and convey a nitrous oxide vapor back to the purification tank; a distillation column disposed on a distal end of the purification tank to receive a nitrous oxide vapor; a condenser disposed on the distillation column, wherein light impurities are removed and a nitrous oxide devoid of light impurities is conveyed and converted into vapor in said vaporizer. A second sub-system having a first dry bed vessel is disposed downstream of the vaporizer to receive the vapor and reacting the acid gas therein; a second dry bed vessel downstream of the said first dry bed vessel for removing water and ammonia in the vapor. A third subsystem having a product tank wherein the purified nitrous oxide vapor is re-condensed; a transferring manifold including a liquid pump, liquid filter and a bypass for distributing the purified nitrous oxide to holding vessels. The invention allows for the removal of impurities and particulates, such that an ultra pure nitrous oxide product having a purity of 99.9998% or higher can be delivered to a point of use.

In this invention, a new $N_2O$ production scheme will be provided to purify the off gas stream or a waste gas flow containing nitrous oxide, by combination of wet scrubber absorption process, adsorption process, flash drum, and/or cryogenic distillation processes with reflux. The invention produces different levels of grade of nitrous oxide for different useful purposes.

BRIEF SUMMARY OF THE INVENTION

In one aspect, the invention provides a system for producing different grade of $N_2O$, the system comprising:

a gas stream containing $N_2O$ and impurities comprising light and heavy impurities, moisture or water, and organic compounds;

a wet scrubbing absorption unit to remove the heavy impurities from the gas stream;

a compressor having at least one stage of compression to compress the gas stream to a preset pressure;

a cooling and dry unit to remove the moisture or water from the gas stream;

an adsorption unit to remove the heavy impurities, the moisture or water and the organic compounds from the gas stream;

a buffer tank to store the gas stream out from the adsorption unit;

a liquefaction unit to at least partially liquefy the gas stream out from the buffer tank to a gas mixture containing $N_2O$ and non-condensation gas, and a liquid mixture;

a releaser to release the gas mixture back to the adsorption unit and to pass the liquid mixture to a distillation unit;

the distillation unit to remove the light impurities and the organic compounds from the liquid mixture through distillation; release a vapor phase gas containing $N_2O$ and non-condensation gas back to the compressor; and generate purified liquid $N_2O$; and a tank to store and distribute the purified liquid $N_2O$;

wherein the wet scrubbing absorption unit comprising a caustic scrubbing unit, an acid scrubbing unit, water scrubbing unit, or combinations thereof;

the distillation unit comprising at least one flash drum, at least one distillation column with reflux, or combinations thereof.

In another aspect, the invention provides another system for producing different grade of $N_2O$, the system comprising:

a gas stream containing $N_2O$ and impurities comprising light and heavy impurities, moisture or water, and organic compounds;

a compressor having at least one stage of compression to compress the gas stream to a preset pressure;

a cooling and dry unit to remove the moisture or water from the gas stream;

an adsorption unit to remove the heavy impurities, the moisture or water and the organic compounds from the gas stream;

a buffer tank to store the gas stream from the adsorption unit;

a liquefaction unit to at least partially liquefy the gas stream out from the buffer tank to a gas mixture containing $N_2O$ and non-condensation gas, and a liquid mixture;

a releaser to release the gas mixture back to the adsorption unit and to pass the liquid mixture to a distillation unit;

the distillation unit to remove the light impurities and the organic compounds from the liquid mixture through distillation; release a vapor phase gas containing $N_2O$ and non-condensation gas back to the compressor; and generate purified liquid $N_2O$; and a tank for store and distribute the purified liquid $N_2O$;

wherein the distillation unit comprising at least one flash drum, at least one distillation column with reflux, or combinations thereof.

In yet another aspect, the invention provides a process of recovering and purifying nitrous oxide ($N_2O$), comprising providing a gas stream containing $N_2O$ and impurities comprising light and heavy impurities, moisture or water, and organic compounds;

removing the heavy impurities from the gas stream through wet scrubbing absorption;

compressing the gas stream to a preset pressure by a compressor having at least one-stage of compression;

removing the moisture or water from the compressed gas stream through a cooling and dry unit;

passing the gas stream through an adsorption unit to remove the heavy impurities, the moisture or water and the organic compounds;

at least partially liquefying the gas stream to obtain a gas mixture containing $N_2O$ and non-condensation gas, and a liquid mixture, releasing the gas mixture back to the adsorption unit;

conveying the liquid mixture to a distillation unit and removing the light impurities and the organic compounds from the liquid mixture, and generating purified liquid $N_2O$;

releasing a vapor phase gas containing $N_2O$ and non-condensation gas back to the compressor; and conveying the purified liquid $N_2O$ to a tank for storage and distribution;

wherein the wet scrubbing absorption removes the heavy impurities to less than 500 ppm.

In yet another aspect, the invention provides a process of recovering and purifying nitrous oxide ($N_2O$), comprising providing a gas stream containing $N_2O$ and impurities comprising light and heavy impurities, moisture or water, and organic compounds;

compressing the gas stream to a preset pressure by a compressor having at least one-stage of compression;

removing the moisture or water from the compressed gas stream through a cooling and dry unit;

passing the gas stream through an adsorption unit to remove the heavy impurities, the moisture or water and the organic compounds;

at least partially liquefying the gas stream to obtain a gas mixture containing $N_2O$ and non-condensation gas, and a liquid mixture, releasing the gas mixture back to the adsorption unit;

conveying the liquid mixture to a distillation unit and removing the light impurities and the organic compounds from the liquid mixture, and generating purified liquid $N_2O$;

releasing a vapor phase gas containing $N_2O$ and non-condensation gas back to the compressor; and conveying the purified liquid $N_2O$ to a tank for storage and distribution.

The gas stream contains 5.0 to 99.9%; preferably 25.0 to 60.0% $N_2O$ by volume. The different grade of purified $N_2O$ ranges from 99.9% to 99.9999% purity.

The light impurities is selected from the group consisting of $N_2$, $O_2$, NO, CO, Ar, $H_2$, methane, $C_2$ and combinations thereof; and heavy impurities is selected from the group consisting of $CO_2$, $NO_2$, CO, $H_2O$, $C_2^+$ and combinations thereof, the organic compound is selected from the group consisting of methane, $C_2^+$, $CH_4$, $C_2$, and combinations thereof; and the non-condensation gas is selected from the group consisting of Ar, $N_2$, $O_2$, CO, NO, methane and combinations thereof.

The gas mixture is used to regenerate the adsorption unit. The adsorption unit comprising at least two parallel adsorption beds and each bed having at least one layer adsorbents; and two parallel adsorption beds are alternately used in continuous swing operation. The distillation unit comprising at least one flash drum, at least one distillation column, or combinations thereof.

BRIEF DESCRIPTION OF SEVERAL VIEWS OF THE DRAWINGS

In the accompanying drawings forming a material part of this description, there are shown.

DETAILED DESCRIPTION OF THE INVENTION

This invention is aimed at recovering and purifying nitrous oxide ($N_2O$) from a $N_2O$ containing gas stream to produce different purification grades of nitrous oxide. The source of the gas stream can be from any process, such as, from an industrial process. A good example of an industrial process is the off gas stream from the production of adipic acid.

The source of the gas stream contains 5.0 to 99.9% nitrous oxide by volume, preferably 20 to 70.0% by volume of nitrous oxide, more preferably 25.0 to 60.0% of nitrous oxide by volume.

The off gas stream from adipic acid production plant, which uses nitric acid as oxidant, usually contains 28.0-55.0% nitrous oxide by volume.

The main impurities in the $N_2O$ enriched stream include but not limited to, $N_2$, $O_2$, $H_2$, Ar, NOx (NO and $NO_2$), CO, $CO_2$, moisture, methane, and other trace organic compounds.

The impurities having molecular mass being equal or bigger than $N_2O$, are hereinafter referred to as heavy impurities. The impurities having molecular mass being less than $N_2O$, are hereinafter referred to as light impurities. Alternatively, the heavy impurities typically have a boiling points that are equal to or bigger than the boiling point of $N_2O$. The light impurities have a boiling points that are less than the boiling point of $N_2O$.

The light impurities include but not limited to $N_2$, $O_2$, NO, CO, Ar, $H_2$. The heavy impurities include but not limited to $CO_2$, $NO_2$, $H_2O$. The organic compounds include but not limited to $C_2^+$, $CH_4$ and $C_2$. Generally, methane and $C_2$ incorporate into the light impurities, while $C_2^+$ to heavy impurities.

Figure 1:
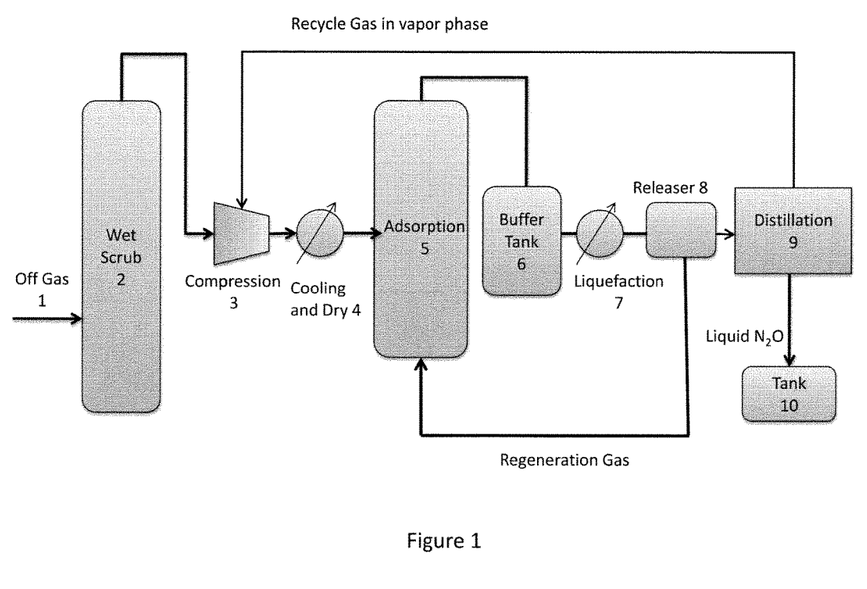
FIG. 1 illustrates a schematic diagram of a system for recovering and purifying $N_2O$ from the off gas stream containing $N_2O$.

FIG. 1 illustrates a schematic diagram of a system for recovering and purifying $N_2O$ in accordance with exemplary embodiments of present invention. The system for recovering and purifying nitrous oxide comprises ten units. The input gas to the system is called "off gas stream" since it is the off gas stream from other process, such as, from adipic acid production plant.

The units 2, 3 and 4 in FIG. 1 are corresponding to the wet scrubbing absorption unit, the compressor unit, and the cool and dry unit, respectively. Those three units are mainly to remove heavy impurities and moisture from the off gas stream 1. The heavy impurities can be removed by wet scrubbing; and moisture can be removed by cool and dry unit after boosting pressure.

The units 5 and 6 in FIG. 1 are corresponding to an adsorption unit and a buffer tank, respectively. The adsorption unit 5 is to further remove heavy impurities, moisture and organic compounds to trace levels. The gas stream from unit 5 is store in the buffer tank 6.

The liquefaction unit 7 in FIG. 1 is to at least partially liquefy the process gas stream from the buffer tank 6 into a gas mixture containing $N_2O$ gas and non-condensation gas and a liquid mixture. The releaser unit 8 releases the gas mixture back to unit 5. The gas mixture is used as the regeneration gas in unit 5. Unit 8 also feeds the liquid mixture to the distillation unit 9.

The non-condensation gas includes but not limited to Ar, $N_2$, $O_2$, CO, NO, methane. Thus, the impurities in the stream are removed by releasing them as part of the non-condensation gas.

The distillation unit 9 in FIG. 1 comprises at least one flash drum, at least one distillation column with reflux, or combinations of a flash drum, or flash drums and a distillation column with reflux, or distillation columns with reflux. Unit 9 removes light impurities through distillation for producing nitrous oxide having the predefined purity. Unit 9 also releases or recycles a vapor phase gas containing $N_2O$ and non-condensation gas to unit 3.

The storage tank unit 10 in FIG. 1 stores and distributes the final purified nitrous oxide with different purity grades from unit 9.

In this system, heavy impurities such as $NO_2$ and $CO_2$ are removed by combination of using absorption from caustic and water wet scrubbers in the wet scrubbing absorption unit 2; and adsorption from the adsorption unit 5. $NO_2$ and $CO_2$ can be removed by using adsorption unit 5 alone.

The molecular mass of carbon dioxide is almost the same as nitrous oxide ($CO_2$: 44.01 and $N_2O$: 44.01). The boiling point difference is only 1.86° C. ($N_2O$: −38.27° C. and $CO_2$: −40.13° C.) at 1.0 MPa (1 MPa=$10^6$ Pa). It is hard and not effective to separate $CO_2$ from $N_2O$ by distillation. $CO_2$ concentration level in the final product should be controlled by wet scrubbing and adsorption processes along with the removal of other heavy impurities such as $NO_2$.

Due to the molecular mass of CO and NO being less than nitrous oxide, the light impurities CO and NO are removed through the combination of the liquefaction unit 7 and the releaser unit 8, after liquefied as part of the non-condensation gases. They can be further controlled to trace level by flash distillation or continuous distillation with reflux companied with removal of methane, argon, oxygen and nitrogen.

Flash distillation is a single-stage continuous operation where a liquid mixture is partially vaporized: the vapor produced and the residual liquid are in equilibrium, which are then separated and removed. The feed is preheated before entering the flash drum. As such, part of the feed may be vaporized. The heated mixture then flows through a pressure-reducing valve to the flash drum, and separation between the vapor and liquid takes place.

Flash distillation is used most for separation components that boil at widely different temperature. It is not effective in separating components of comparable volatility or of trace level, which requires the use of continuous distillation with reflux.

For high concentration of carbon monoxide (CO), catalytic conversion of carbon monoxide to carbon dioxide over catalyst may be applied, in which oxygen existing in the gas stream. Then the product $CO_2$ is removed by caustic and water wet scrubbers.

For high concentrations of NO and $NO_2$, ozone could be introduced before wet scrubbing process. Ozone will rapidly oxidize insoluble NO and $NO_2$ to soluble oxidized compounds such as $N_2O_5$. Ozone is produced on site and on demand by passing oxygen through an ozone generator.

There might be organic compounds in gas stream, which could be from production plant or from compressor (lubricating oil). In this system, organic compounds $C_2^+$ ($C_2^+$ means organic compounds having carbon number over two) can be removed by adsorption in adsorption unit 5 to trace level. Trace $CH_4$ and $C_2$ ($C_2$ means organic compounds having carbon number equal two) can be removed by flash distillation or continuous distillation with reflux in unit 9 along with other light impurities.

Present invention removes most part of heavy impurities including but not limited to $CO_2$ and $NO_2$ by wet scrubbing absorption unit 2 and controls heavy impurities to trace level in the products by adsorption unit 5. Most part of Ar, $N_2$ and $O_2$ in the $N_2O$ enriched stream can be separated by releaser 8 as non-condensation gases after liquefying. The flash drum or distillation column with reflux is used to further purify and lower the light impurities concentration such as CO, NO, Ar, $CH_4$, $N_2$ and $O_2$ to meet the allowed limited amount the product.

The system offers the flexibility of producing different grades of $N_2O$, such as industrial grade, medicinal grade, and electronic grade with purity ranging from 90% to 99.999$^+$% to meet different requirements from different customers.

The process uses the system shown in FIG. 1 for recovering and purifying $N_2O$ is described in detail below.

The $N_2O$ enriched off gas stream 1 is fed to the wet scrubbing absorption unit 2 to remove most part of $NO_2$ and $CO_2$. The wet scrubbing unit comprises of caustic scrubber, an acid scrubbing unit, water scrubber and combinations thereof in series. $NO_2$ and $CO_2$ will be controlled to preset values at the outlet of the wet scrubbing unit 2, for example, less than 500 ppm (ppm means $10^{-6}$ by volume).

After cleaning water droplets from the gas stream, one or multi-stage compressor unit 3 is used to boost the gas stream to a preset pressure.

Higher pressure is required for the disclosed system. If the pressure of the incoming gas stream is low, the pressure needs to be boosted before the gas stream enters the adsorption unit 5. The compressed pressure of the gas stream is mainly determined by the pressure requirement for the product and the pressure drop across whole production process.

For example, the inlet pressure of the off gas stream from the adipic acid production process is usually about 0.12-0.20 MPa. The pressure needs to be boosted to 2.0 to 5.0 MP, preferably 2.0 to 4.0 MP; more preferably 3.0 MPa to 4.0 MPa before the gas stream enters adsorption unit 5.

The saturation pressure of nitrous oxide $N_2O$ is 1.801 MPa at temperature of −20° C. The operation pressure should be over 3.602 MPa to liquefy $N_2O$ at −20° C., if the inert gas (non-condensation gas such as argon, nitrogen and oxygen) is about 50.0% of the total gas mixture. The pressure drop passing through different operation units should be taken into account too.

The gas stream is mixed with another stream (vapor) coming from the unit 9 at the inlet of the second stage of the compressor unit 3 (for a compressor has at least two stages). The mixed gas stream then passes through the cold and dry unit 4. Unit 4 further decreases the temperature and removes condensed water or mist.

The adsorption unit 5 comprises at least two adsorption beds. The one- or multi-layer beds are packed with different kind of adsorbents, such as activated carbon, active alumina, and 13X molecular sieve. The adsorption unit 5 removes moisture, $CO_2$ and $NO_2$ to a requisite level, and removes trace organic compounds which probably come from the off gas stream or compressor lubricant.

The adsorption unit can also be used to remove trace hydrocarbons $C_2^+$.

In practice, inorganic molecular sieve could be used to replace activated carbon to remove trace organic compounds for safety reason. In addition, two parallel adsorption beds can be alternately used for continuous operation: one is in adsorption, another one is in regeneration. The adsorption process is a critical step to lower the concentrations of $CO_2$ and $NO_2$ to the requisite values in the product.

The gas stream from unit 5 is then stored in a buffer tank unit 6.

At preset pressure and temperature, the liquefier in the liquefaction unit 7 will partially liquefy the gas stream from unit 6. The two phase fluid stream containing both gas and liquid from the liquefaction unit 7 is fed to the releaser unit 8.

Unit 8 separates the non-condensation gas, mainly argon, nitrogen and oxygen with trace CO, NO and methane. The non-condensation gas is then sent (or released) back to adsorption unit 5 to regenerate the spent adsorption beds (purging and cooling down). The liquid mixture from the bottom of the releaser unit 8 is fed to distillation unit 9, the flash drum or distillation column with reflux.

The light hydrocarbons methane and $C_2$, which are difficult to be removed completely by adsorption, can be removed by flash distillation along with other light impurities such as CO and NO in unit 9.

A vapor containing $N_2O$ over 90% by volume and non-condensation gas from unit 9 is sent (or recycled) back to the second stage of the compressor 3. The liquid phase that is the purified liquid $N_2O$, from the bottom of unit 9 is sent to unit 10 for storage or distribution.

There are some heat exchangers and mixers (not shown in FIG. 1) for energy recovery and cooling or heating the gas stream in the process. The gas stream from every stage of compressor will be cooled by cooling water or other chilled media; the compressors in both cool and dry unit and the liquefaction unit are also cooled by cooling water or other chilled media too. The non-condensation gas and the liquid out of the releaser unit 8 and unit 9 will exchange heat with the gas stream in the process.

Purpose of the heat exchange between the liquid mixture out of the releaser unit 8 and the gas stream from adsorption unit 5 are to increase the temperature of the liquid mixture to feed to unit 9 and to lower the temperature for the gas stream for liquefaction. After heat exchange, the gas stream is stored in buffer tank 6 and is liquefied by refrigerator in unit 7. The temperature of the liquid mixture after heat exchange is a critical parameter to determine the light impurities level in the product. How much of light impurities is removed to the vapor (and remained in the liquid) depends on the condition of the feed to unit 9, i.e. how much of the feed is entering as vapor state, which in turn is controlled by the amount of heating. In other words, the degree of vaporization affects the concentration (distribution) of light impurities in vapor phase and liquid phase.

As an example, the procedure to obtain a 99.9% purity nitrous oxide production is describing in detail.

The $N_2O$ enriched off gas stream with pressure 0.15 MPa is fed to the caustic wet scrubber to remove most part of $NO_2$ and $CO_2$. The water scrubber is added to clean caustic droplets from the gas stream. The pressure drop across the two wet scrubbings is about 0.05 MPa. As the control parameters, NO2 and $CO_2$ are to be less than 500.0 ppm after scrubbing process. The pumps are used to feed the caustic solution and water to the upper part of the scrubbers, respectively.

After separation of the caustic droplets, the gas stream is mixed with the vapor (95.6% $N_2O$ by volume with pressure 1.0 MPa and temperature −39.7° C.) from the distillation unit 9 rights before the second stage of the compressor.

Two-stage compressor is adopted to boost the pressure from 0.10 MPa to 1.0 MPa (first stage) and to 3.04 MPa (second stage). The cooling agent is water for cooling down the compressed gas stream from 139.2° C. to 38.0° C.

Cool and dry unit is used to cool down the gas to 10° C. and remove the condensation water.

One heat exchanger is used to further lower the temperature of the gas stream to −1.0° C. through heat exchange between the gas stream and the non-condensation gas from the releaser unit 8 (32.6% $N_2O$ by volume with pressure 1.1 MPa and temperature −66.1° C.). The non-condensation gas after the heat exchange is then used for regeneration of the spent adsorption beds (purge, regeneration, heating, and cooling) in the adsorption unit 5. The gas stream from buffer tank 6 is used to repressurize the spent adsorption bed for next cycle.

The two parallel adsorption beds are multi-layers beds packed with activated carbon, active alumina, 13X molecular sieve for the removal of organic compounds ($C_2^+$), moisture, carbon dioxide, nitrogen dioxide, respectively. The critical parameters for the gas stream out of the adsorption bed are: the concentration of $CO_2$ is less than 1.0 ppm and $NO_2$ is less than 0.5 ppm. The two parallel adsorption beds are in swing operation; one is in adsorption, another one is in regeneration.

The gas stream out of the adsorption bed with −1° C. is fed to another heat exchanger, wherein the gas stream undergoes the heat exchange with the saturated liquid from the bottom of the releaser unit 8 to heat and increase the temperature to a preset value (from −66.4° C. to −39.7° C.) for flash evaporation at the distillation unit 9.

The liquid temperature (or the pressure) is critical to the successful operation of the flash drum. After the last heat exchange, the gas stream with −29.2° C. is stored in the buffer tank 6. The gas stream from the buffer tank 6 is then sent to the liquefaction unit 7 and is liquefied by refrigerator in the liquefaction unit 7.

The two phase fluid stream from the liquefaction unit 7 is fed to the releaser unit 8 to separate and remove the non-condensation gas, mainly nitrogen, argon, and oxygen with trace of CO, NO and organic compounds such as methane. The non-condensation gas is fed to the adsorption unit to cool down the gas stream. The liquid stream from the bottom of the releaser unit 8 with increased temperature is sent to the flash drum. The flash fraction (about 60%) depends on the operation conditions and the restricted concentration for the impurities in the final products. The vapor with trace of non-condensation gas is fed and mixed with the gas stream in the second stage of the compressor. The liquid phase is the product and is sent to liquid tank unit 10.

A person skilled in the art would understand that some detectors should be installed to monitor and test the concentrations, temperature, flow rate and pressure.

EXAMPLES

Based on the database and thermodynamic method, a series of simulations have been done by the commercial software ASPEN Plus.

The off gas stream from an adipic acid production plant, which uses nitric acid as oxidant, usually contains 28.0-55.0% nitrous oxide by volume. Compositions from an off gas stream from a typical adipic acid plant was listed in the Table 1. The similar off gas stream was used in the following simulations.

It should be pointed that the $N_2O$ enriched off gas stream from the said adipic acid plant was mixed with air first to produce dilute $HNO_3$ by oxidation of NOx and passing through 3 sequential water scrubbers, then the gas stream was sent into the droplet separator to separate the droplet and aerosols.

The analytical result for the off-gas stream shown in Table 1 was from the off gas stream after the droplet separator in the plant with dry base. The NO was the main component in NOx in Table 1.

TABLE 1

Analytical result for the off-gas stream (dry base)

| Item | Results (v/v) (Sample 1) | Results (v/v) (Sample 2) | Test Methods |
|---|---|---|---|
| $N_2O$ | 47.47% | 49.45% | GC-ECD* |
| $N_2$ | 41.90% | 40.52% | GC-TCD** |
| NOx*** | 68 ppm | 78 ppm | Nitrogen Oxides Analyzer |
| $O_2$ | 3.90% | 3.50% | GC-TCD |
| CO | 0.21% | 0.23% | GC-TCD |
| $CO_2$ | 6.51% | 6.29% | GC-TCD |
| Hydrocarbons | <2 ppm | <2 ppm | GC |

*GC-ECD: Gas Chromatography- electron capture detector
**GC-TCD: Gas Chromatography- thermal conductivity detector
***$NO_X$: NO, and $NO_2$ Example 1

Production of 99.9% Purity $N_2O$

In this example, a system comprising wet scrubbing unit, compressor, cool and dry unit, adsorption unit, liquefier, releaser, and flash drum, was used to produce 99.9% $N_2O$.

The simulation result was shown in Table 2.

The initial fraction of $N_2O$, in the gas stream was 47.42%, raised to 49.10% after wet scrubbing, to 54.66% after adsorption, to 98.81% in liquid phase in the releaser unit, and to 99.92% after the flash drum. The 99.92% $N_2O$ liquid was stored as the product. The $N_2O$ recovery ratio was 53.53%, where the recovery ratio was defined as the $N_2O$ mass fraction in the product to that in the off gas.

For $CO_2$, the initial fraction was 6.50%, reduced to 0.27% by wet scrubbing, then further reduced to 0.51 ppm by adsorption. After flash, the final fraction in the product was 0.94 ppm.

For CO, the initial fraction was 0.21%. CO was difficult to be removed effectively by wet scrubbing and adsorption. Very small amount of CO could dissolve in water. CO can be removed by adsorption, however it was not economic compared to flash distillation. CO was released as non-condensation gas in releaser and reduced to 45.6 ppm, and further reduced to 2.46 ppm after flash in the product.

For NO, the initial fraction was 50.0 ppm. NO was difficult to be reduced by wet scrubbing and adsorption. Very small amount of NO could dissolve in water. NO was released as non-condensation gas in the releaser and reduced to 6.0 ppm, and reduced to 0.944 ppm after flash in the product.

TABLE 2

Production of 99.9% $N_2O$

| From | Feeding | Wet Scrubbing | Adsorption | Liquefier | Releaser | Releaser | Flash | Flash |
|---|---|---|---|---|---|---|---|---|
| To | Wet Scrubbing | Compressor | Liquefier | Releaser | Adsorption | Flash | 2nd Stage compressor | Storage |
| Temperature (° C.) | 20.0 | 25.3 | −1.0 | −49.0 | −66.3 | −39.7 | −39.7 | −39.7 |
| Pressure (MPa) | 0.15315 | 0.101325 | 3.041325 | 3.001325 | 1.101325 | 1.001325 | 1.001325 | 1.001325 |
| Mass Flow (kg/hr) | 164.2169 | 153.7882 | 168.4743 | 168.4743 | 101.3516 | 67.1206 | 17.25173 | 49.86887 |
| Component Fraction by Volume | | | | | | | | |
| $O_2$ | 0.038963 | 0.040383 | 0.038783 | 0.038783 | 0.057258 | 2.20E−03 | 7.76E−03 | 2.42E−04 |
| $N_2$ | 0.418598 | 0.433863 | 0.412509 | 0.412509 | 0.615926 | 9.67E−03 | 0.035672 | 5.42E−04 |
| $N_2O$ | 0.474245 | 0.490901 | 0.546589 | 0.546589 | 0.323656 | 0.988075 | 0.956375 | 0.999209 |
| $H_2O$ | 9.99E−04 | 0.032358 | 6.85E−07 | 6.85E−07 | 6.76E−10 | 2.04E−06 | 1.19E−08 | 2.75E−06 |
| CO | 2.10E−03 | 2.17E−03 | 2.07E−03 | 2.07E−03 | 3.09E−03 | 4.56E−05 | 1.68E−04 | 2.46E−06 |
| $CO_2$ | 0.065038 | 2.68E−04 | 5.07E−07 | 5.07E−07 | 3.05E−07 | 9.06E−07 | 9.15E−07 | 9.04E−07 |
| NO | 5.00E−05 | 5.18E−05 | 5.06E−05 | 5.06E−05 | 7.32E−05 | 5.98E−06 | 2.03E−05 | 9.44E−07 |
| $NO_2$ | 9.99E−06 | 3.09E−08 | 2.85E−08 | 2.85E−08 | 8.59E−11 | 8.47E−08 | 1.59E−09 | 1.14E−07 |

For $H_2O$, the initial fraction was 999.0 ppm; no matter how much water it contains, $H_2O$ in the gas stream will become nearly saturation after scrubbing. After cool and dry unit, the fraction of water will be reduced, and water was further reduced to 0.685 ppm by adsorption, the fraction of water in the product was about 2.75 ppm.

For $O_2$, the initial fraction was 3.90%. $O_2$ was difficult to be reduced by wet scrubbing and adsorption (very small amount of $O_2$ could dissolve in water), $O_2$ was released as non-condensation gas in the releaser and reduced to 0.22%, and further reduced to 240 ppm after flash in the product.

For $N_2$, the initial fraction was 41.86%. $N_2$ was difficult to be reduced by wet scrubbing and adsorption (very small amount of $N_2$ could dissolve in water), $N_2$ was released as non-condensation gas in the releaser and reduced to 0.97%, and further reduced to 542.0 ppm after flash in the product.

In the whole process, critical parameters for successful operation includes the compressor discharge pressure, the $CO_2$ and $H_2O$ concentrations after adsorption, the temperature and pressure in liquefier, the inlet temperature and pressure in the flash drum.

Example 2

Production of 99.999% Purity $N_2O$

In this example, a system comprising a wet scrubbing unit, compressor, cool and dry unit, adsorption unit, liquefier and releaser, and a distillation column with reflux, was used to produce 99.999% $N_2O$. The column has 10 theoretical trays and was operating with reflux ratio 2 (reflux ratio was the ratio of the reflux to the overhead product). The final result was listed in Table 3.

For $N_2O$, the initial fraction was 47.42%, after wet scrubbing, was raised to 49.10%, then to 56.52% after adsorption, to 98.81% after releaser unit, and to 99.9993% after distillation, and was stored as the product. The $N_2O$ recovery ratio was 52.82%.

For $CO_2$, the initial fraction was 6.50% and was reduced to 0.27% by wet scrubbing, then further reduced to 0.485 ppm by adsorption. The final fraction in product was 0.781 ppm.

For CO, the initial fraction was 0.21%. CO was released as non-condensation gas in the releaser and reduced to 45.3 ppm, and further reduced to nearly zero ppm in the product.

For NO, the initial fraction was 50.0 ppm. NO was released as non-condensation gas in the releaser and reduced to 6 ppm, and becomes nearly zero ppm in the product.

TABLE 3

Production of 99.999% $N_2O$

| From | Feeding | Wet Scrubbing | Adsorption | Liquefier | Releaser | Releaser | Distillation Column | Distillation Column |
|---|---|---|---|---|---|---|---|---|
| To | Wet Scrubbing | Compressor | Liquefier | Releaser | Adsorption | Column | 2nd Stage compressor | Storage |
| Temperature (° C.) | 20.0 | 25.3 | −1.0 | −49.0 | −66.1 | −39.4 | −40.0 | −38.7 |
| Pressure (MPa) | 0.15315 | 0.101325 | 3.041325 | 3.001325 | 1.101325 | 1.001325 | 0.98 | 0.97 |
| Mass Flow (kg/hr) | 164.4003 | 153.7882 | 177.3239 | 177.3239 | 102.0083 | 75.31555 | 26.09674 | 49.21882 |
| Component Fraction by Volume | | | | | | | | |
| $O_2$ | 0.038963 | 0.040382 | 0.037277 | 0.037277 | 0.05706 | 2.19E−03 | 6.26E−03 | 8.06E−16 |
| $N_2$ | 0.418598 | 0.433868 | 0.395508 | 0.395508 | 0.613058 | 9.62E−03 | 0.02756 | 2.90E−18 |
| $N_2O$ | 0.474245 | 0.490898 | 0.565183 | 0.565183 | 0.326736 | 0.988135 | 0.966034 | 0.999993 |
| $H_2O$ | 9.99E−04 | 0.032357 | 1.46E−06 | 1.46E−06 | 1.37E−09 | 4.05E−06 | 1.03E−23 | 6.23E−06 |

TABLE 3-continued

| | Production of 99.999% $N_2O$ | | | | | | | |
|---|---|---|---|---|---|---|---|---|
| CO | 2.10E−03 | 2.17E−03 | 1.98E−03 | 1.98E−03 | 3.07E−03 | 4.53E−05 | 1.30E−04 | 9.30E−21 |
| $CO_2$ | 0.065038 | 2.68E−04 | 4.85E−07 | 4.85E−07 | 2.85E−07 | 8.40E−07 | 9.51E−07 | 7.81E−07 |
| NO | 5.00E−05 | 5.18E−05 | 4.89E−05 | 4.89E−05 | 7.32E−05 | 5.95E−06 | 1.70E−05 | 1.03E−16 |
| $NO_2$ | 9.99E−06 | 3.09E−08 | 2.79E−08 | 2.79E−08 | 8.03E−11 | 7.72E−08 | 2.40E−21 | 1.19E−07 |

For $H_2O$, the initial fraction was 1000 ppm. After cool and dry unit, it will be reduced, and further to 1.46 ppm after adsorption, the water fraction in the product was about 6.23 ppm.

For $O_2$, the initial fraction was 3.9%. $O_2$ was released as non-condensation gas in the releaser and reduced to 0.22%, and further reduced to about zero ppm after distillation.

For $N_2$, the initial fraction was 41.86%. $N_2$ was released as non-condensation gas in the releaser and reduced to 0.96%, and further reduced to about zero ppm after distillation.

In the whole process, critical parameters for successful operation includes the compressor discharge pressure, the outlet concentration of $CO_2$ and $H_2O$ after adsorption, the outlet temperature out of liquefier, the pressure in releaser unit, the theoretical tray number of distillation column and the reflux ratio, column operation pressure, and inlet feed temperature to the distillation column.

Example 3

Production of 99.9% Purity $N_2O$ without Wet Scrubbing

In this example, a system comprises a compressor, cool and dry unit, adsorption unit, liquefier and releaser, and flash drum, was used to produce 99.9% $N_2O$ without wet scrubbing process. This was a simplified process which can produce qualified product.

The result was listed in Table 4.

For $CO_2$, the initial fraction was 6.50% and was reduced to 63.3 ppm by adsorption. After flash, the final fraction in product was 112.0 ppm. The length of adsorption column should be longer to handle the removing of $CO_2$ without scrubbing unit.

For CO, the initial fraction was 0.21%, CO may be removed by adsorption; flash process was adopted in this process. CO was released as non-condensation gas in the releaser and reduced to 45.5 ppm, and further reduced to 2.37 ppm in the product.

For NO, the initial fraction was 50.0 ppm. NO was released as non-condensation gas in the releaser and reduced to 6.0 ppm, and to be 0.91 ppm in the product.

For $H_2O$, the initial fraction was 1000 ppm. After cool and dry unit, the fraction will be reduced, and to be 0.097 ppm after adsorption. The water fraction in the product was about 0.39 ppm.

For $O_2$, the initial fraction was 3.9%. $O_2$ may be removed by adsorption; flash process was adopted in this process. $O_2$ was released as non-condensation gas in the releaser and reduced to 0.22%, and further reduced to about 234 ppm in the flash drum.

For $N_2$, the initial fraction was 41.86%. $N_2$ could be removed by adsorption; flash was adopted in this process. $N_2$ was released as non-condensation gas in the releaser and reduced to 0.97%, and further reduced to 523.0 ppm in the flash drum.

In the whole process, critical parameters for successful operation includes the compressor discharge pressure, the

TABLE 4

| | Production of 99.9% $N_2O$ without Wet Scrubbing | | | | | | |
|---|---|---|---|---|---|---|---|
| From To | Feeding Compressor | Adsorption Liquefier | Liquefier Releaser | Releaser Adsorption | Releaser Flash | Flash 2nd Stage compressor | Flash Storage |
| Temperature (° C.) | 20.0 | −1.0 | −49.0 | −66.3 | −39.6 | −39.6 | −39.6 |
| Pressure (MPa) | 0.15315 | 3.041325 | 3.001325 | 1.101325 | 1.001325 | 1.001325 | 1.001325 |
| Mass Flow (kg/hr) | 164.2169 | 169.5656 | 169.5656 | 101.4353 | 68.13675 | 18.19446 | 49.94228 |
| | Component Fraction by Volume | | | | | | |
| $O_2$ | 0.038963 | 0.038587 | 0.038587 | 0.057228 | 2.20E−03 | 7.50E−03 | 2.34E−04 |
| $N_2$ | 0.418598 | 0.410342 | 0.410342 | 0.615577 | 9.67E−03 | 0.034403 | 5.23E−04 |
| $N_2O$ | 0.474245 | 0.548891 | 0.548891 | 0.323999 | 0.987945 | 0.957799 | 0.999088 |
| $H_2O$ | 9.99E−04 | 9.72E−08 | 9.72E−08 | 9.53E−11 | 2.87E−07 | 1.70E−09 | 3.92E−07 |
| CO | 2.10E−03 | 2.06E−03 | 2.06E−03 | 3.09E−03 | 4.55E−05 | 1.62E−04 | 2.37E−06 |
| $CO_2$ | 0.065038 | 6.33E−05 | 6.33E−05 | 3.79E−05 | 1.13E−04 | 1.14E−04 | 1.12E−04 |
| NO | 5.00E−05 | 5.04E−05 | 5.04E−05 | 7.31E−05 | 5.97E−06 | 1.97E−05 | 9.14E−07 |
| $NO_2$ | 9.99E−06 | 9.77E−06 | 9.77E−06 | 2.93E−08 | 2.88E−05 | 5.51E−07 | 3.92E−05 |

For $N_2O$, the initial fraction was 47.42%. $N_2O$ was raised to 54.89% after adsorption, to 98.80% after the releaser unit, to 99.91% after the flash drum. The $N_2O$ recovery ratio was 53.53%.

outlet concentration of $CO_2$ and $H_2O$ from adsorption, the outlet temperature out of the liquefier, the releaser pressure, the operation pressure and the feed temperature to the flash drum.

Example 4

Distillation to Remove $CO_2$

Figure 2A:
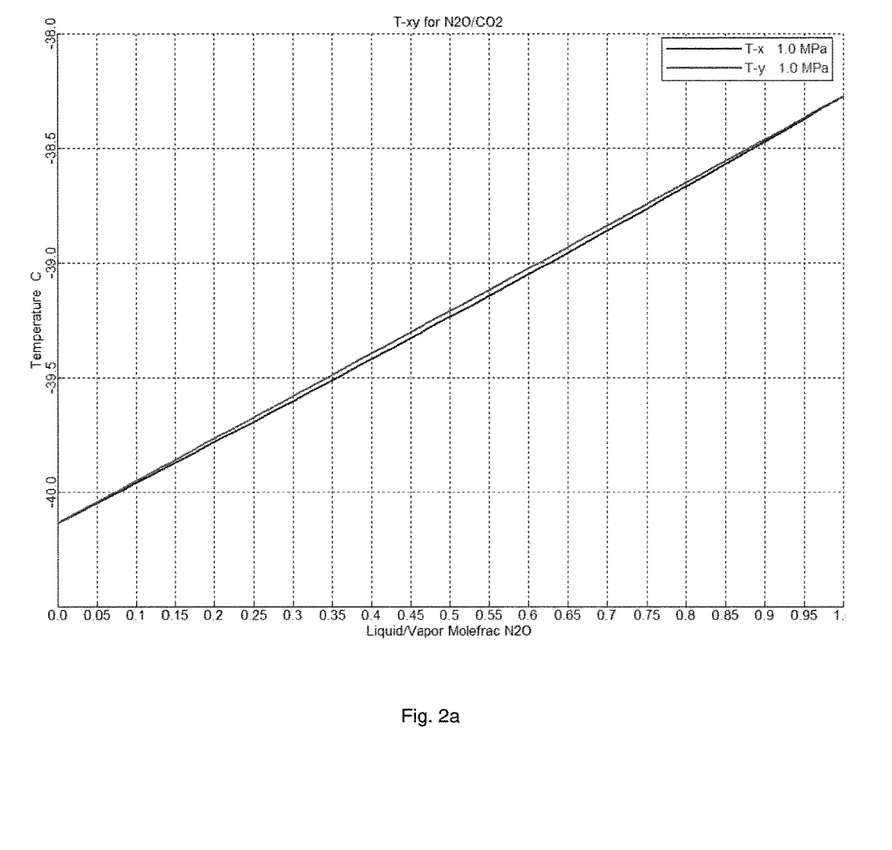
FIG. 2(a) shows phase diagram of $N_2O$ and $CO_2$ at 1.0 MPa.

In this example, a phase analysis for $CO_2$ and $N_2O$ was carried out. The result of T-x-y diagram under 1.0 MPa was shown in FIG. 2a. The graph shows that boiling points for $CO_2$ was −40.19° C. and for $N_2O$ was −39.61° C., respectively. The difference was 0.58° C., indicating that it was quite hard to separate $CO_2$ from $N_2O$ using distillation.

Figure 2B:
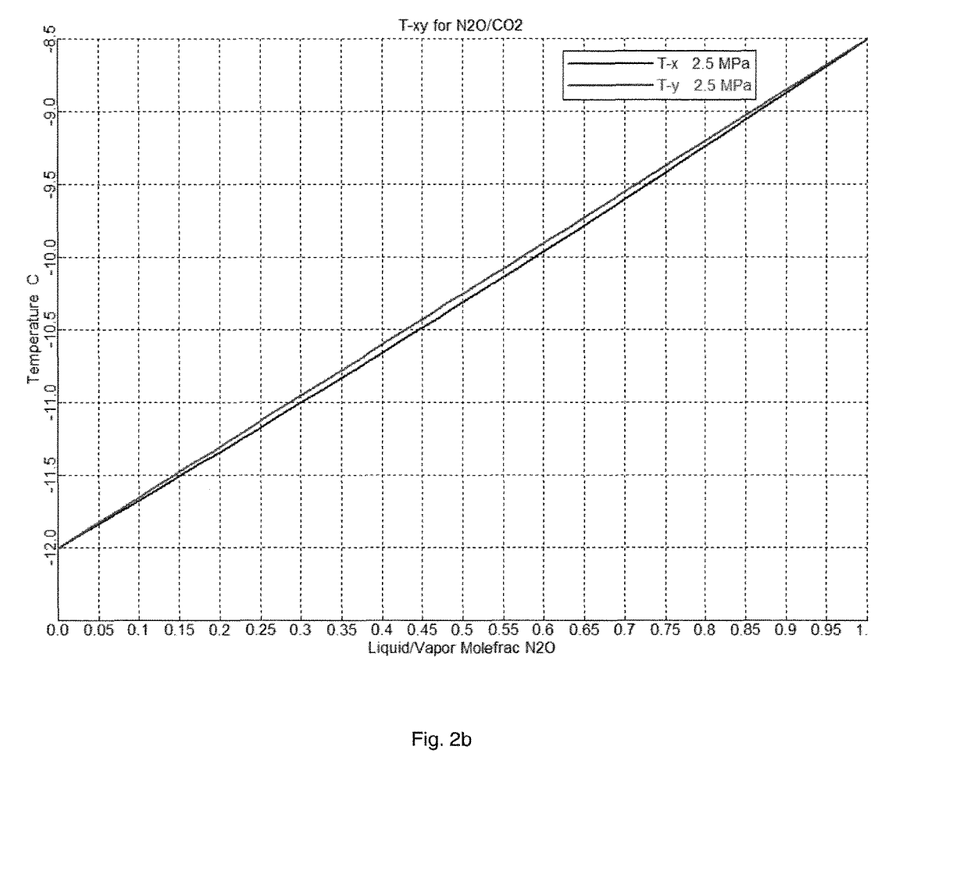
FIG. 2(b) shows the phase diagram of $N_2O$ and $CO_2$ at 2.5 MPa.

Even under 2.5 MPa, the boiling point difference was 3.5° C. It was still hard to separate $CO_2$ from $N_2O$ using distillation, as shown in FIG. 2b.

For other heavy components, such as $NO_2$, similar conclusion could be derived.

Thus, distillation was not effective to remove $CO_2$ from $N_2O$.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:

1. A system for of recovering and purifying $N_2O$, the system comprising:
   a gas stream comprising $N_2O$ and impurities comprising light and heavy impurities, water, and organic compounds, the gas stream first entering a wet scrubbing absorption unit that is selected from the group consisting of: a caustic scrubbing unit, an acid scrubbing unit, water scrubbing unit, and combinations thereof;
   a compressor having at least one stage of compression that compresses the gas stream from the wet scrubber to a preset pressure greater than 1.0 MPa;
   a cooling and drying unit that cools the gas stream from the compressor to less than 10.0° C. and removes condensed water;
   an adsorption unit comprising at least two parallel adsorption beds, each bed having at least one adsorbent layer adapted to remove heavy impurities, water and organic compounds from the gas stream from the cooling and drying unit;
   a buffer tank that stores the gas stream from the adsorption unit;
   a liquefaction unit that partially liquefies the gas stream from the buffer tank to create: (1) a first recycle gas mixture containing $N_2O$ and at least one non-condensation gas, and (2) a liquid mixture containing $N_2O$;
   a releaser in fluid communication with the buffer tank and a distillation unit, wherein the releaser transmits the first recycle gas mixture from the liquefaction unit back to the adsorption unit and passes the liquid mixture from the liquefaction unit to the distillation unit, wherein the buffer tank is adapted to permit the gas to flow back to the adsorption unit via the releaser to repressurize the adsorption unit to the preset pressure, wherein
   the distillation unit is selected from a group consisting of a flash drum, a distillation column with reflux, and combinations thereof, wherein the distillation unit removes light impurities and organic compounds from the liquid mixture, and directs: (1) a second recycle gas mixture containing $N_2O$ and at least one non-condensation gas directly back to the compressor, and (2) purified liquid mixture to a holding tank; wherein,
   the gas stream exiting the wet scrubber has less than 500.0 ppm of $NO_2$ and $CO_2$,
   the gas stream exiting the adsorption unit has less than 0.5 ppm of $NO_2$ and less than 1.0 ppm of $CO_2$, and
   the purified liquid mixture has a $N_2O$ concentration of greater than 99.9% by volume.

2. The system according to claim 1, wherein
prior to entering the wet scrubbing absorption unit, the gas stream contains 5.0 to 99.9% $N_2O$ by volume, and wherein
   the light impurities are selected from the group consisting of $N_2$, $O_2$, NO, CO, Ar, $H_2$, methane, and $C_2$ compounds;
   the heavy impurities are selected from the group consisting of $CO_2$, $NO_2$, CO, $H_2O$, and $C_{2+}$ compounds;
   the organic compound is selected from the group consisting of methane, $C_{2+}$ compounds, $CH_4$, and $C_2$ compounds;
the first recycle gas mixture and the second recycle gas mixture both include molecules selected from the group consisting of Ar, $N_2$, $O_2$, CO, NO, and methane; and
the purified liquid mixture has a $N_2O$ concentration ranging from 99.9% to 99.9999% by volume.

3. The system according to claim 1, wherein
the compressor has at least two stages of compression and the second recycle gas mixture is introduced to the compressor between the first and the second stage; and
the preset pressure of the gas mixture exiting the second stage of compression ranges from between 2.0 to 5.0 MPa.

4. The system according to claim 1, wherein
the parallel adsorption beds are alternately used in continuous swing operation and the first recycle gas mixture is used to regenerate the adsorption unit; and
the adsorbent layer comprises molecular sieves selected from the group consisting of 13X, 3A, 4A, 5A, CaX, silica gel, calcium Y zeolite, zinc X zeolite, molecular sieve with high ratio of silica to alumina, active alumina, activated carbon, and combinations thereof.

5. The system according to claim 1, wherein
the gas stream is an off gas stream from adipic acid production process or nitric acid production process; and
prior to entering the wet scrubbing absorption unit, the gas stream contains
   28.0 to 70.0% $N_2O$ by volume,
   1.0 to 6.0% $O_2$ by volume,
   20.0 to 60.0% $N_2$ by volume,
   0.2 to 1.0% Ar by volume,
   2 to 10.0% $CO_2$ by volume,
   0.1 to 1.0% CO by volume,
   1.0 ppm to 0.5% $NO_2$ by volume,
   1.0 ppm to 1.0% NO by volume, and
   1.0 ppm to 0.1% hydrocarbons by volume.

* * * * *